United States Patent [19]

Toyoshima

[11] Patent Number: 4,958,381

[45] Date of Patent: Sep. 18, 1990

[54] TWO WAY COMMUNICATION SYSTEM

[75] Inventor: Masakatsu Toyoshima, Kanagawa, Japan

[73] Assignee: Sony Corporation, Tokyo, Japan

[21] Appl. No.: 148,591

[22] Filed: Jan. 26, 1988

[30] Foreign Application Priority Data

Feb. 17, 1987 [JP] Japan ................................. 62-33945
Feb. 26, 1987 [JP] Japan ................................. 62-43438
Feb. 26, 1987 [JP] Japan ................................. 62-43437

[51] Int. Cl.$^5$ ............................................. H04H 1/06
[52] U.S. Cl. .......................................... 455/4; 358/86; 340/825.08
[58] Field of Search ................... 455/2, 4, 5; 358/102, 358/84, 86; 370/90, 96, 89, 95; 340/825.05, 825.07, 825.08, 825.52

[56] References Cited

U.S. PATENT DOCUMENTS

| 3,444,521 | 5/1969 | Breese | 340/825.07 |
|---|---|---|---|
| 3,602,891 | 8/1971 | Clark et al. | 340/172.5 X |
| 3,757,225 | 9/1973 | Ulicki | 358/86 X |
| 3,997,718 | 12/1976 | Ricketts et al. | 325/31 |
| 4,247,106 | 1/1981 | Jeffers et al. | 358/93 |
| 4,419,666 | 12/1983 | Gurr et al. | 379/102 |
| 4,428,078 | 1/1984 | Kuo | 455/3 |
| 4,513,315 | 4/1985 | Dekker et al. | 358/86 |
| 4,521,021 | 6/1985 | Dixon | 358/254 |
| 4,554,579 | 11/1985 | Citta | 358/86 |
| 4,584,603 | 4/1986 | Harrison | 358/86 |
| 4,591,906 | 5/1986 | Morales-Garza et al. | 358/84 |
| 4,633,462 | 12/1986 | Stifle et al. | 370/85 |
| 4,647,980 | 3/1987 | Steventon et al. | 358/254 |
| 4,684,981 | 8/1987 | Toyoshima et al. | 358/86 |
| 4,774,514 | 9/1988 | Hildebrandt | 340/825.06 |
| 4,829,560 | 5/1989 | Evanyk et al. | 379/106 |

FOREIGN PATENT DOCUMENTS

| 103438 | 3/1984 | European Pat. Off. |
|---|---|---|
| 144770A | 6/1985 | European Pat. Off. |
| 54-105499 | 7/1979 | Japan |
| 57-199369 | 12/1982 | Japan |
| 59-15387 | 1/1984 | Japan |
| 59-15388 | 1/1984 | Japan |

OTHER PUBLICATIONS

"Design Technique for Multiplexing Asynchronous Digital Video and Audio Signal," by J. H. Stott, IEEE Transactions on Communications, vol. COM-26, No. 5, May 1987.

Boeing Electronics Company brochure entitled "Putting the Future of Passenger Services and Entertainment at your Fingertips," 1987, six pages.

Boeing, "Proceedings of the SCAR Conference—Part 2," Mar. 1977, pp. 854 and 864.

Primary Examiner—Benedict V. Safourek
Assistant Examiner—Tesfaldet Bocure
Attorney, Agent, or Firm—Philip M. Shaw, Jr.

[57] ABSTRACT

An information transmitting system capable of two way communication, suitable for use in transmitting information signals between a central control unit and a plurality of terminal apparatus units. Each terminal apparatus unit may be located at a different passenger seat in an aircraft, a train, a bus, or the like. The signals transmitted from each terminal apparatus to the central control unit are transmitted by way of two channels. In one operating mode, one channel is used as a random access channel, and the other is used as a polling channel. When polling transmission is not effected, the polling channel is used as a second random access channel, so that the system may efficiently transmit many information signals on two random access channels.

10 Claims, 9 Drawing Sheets

TWO WAY COMMUNICATION SYSTEM

FIELD OF THE INVENTION

This invention relates to a two way communication system suitable for transmitting information signals between a central control unit and a number of terminals. More particularly, the invention relates to a two way communication system for transmitting information signals between a central control unit and a number of terminals, each terminal serving a passenger seat, for example, in an aircraft, a train, a bus, or the like.

BACKGROUND OF THE INVENTION

Provision of an individual video display for each of the passenger seats in a passenger vehicle such as an aircraft has been disclosed in U.S. Pat. No. 4,584,603, issued Apr. 22, 1986 to Harrison. In the system of U.S. Pat. No. 4,584,603, the passenger seats are provided with video displays A control apparatus supplies a plurality of video signals in parallel to each display. The video display at each passenger seat selects one of the video signals and displays the selected video signal.

In the system of U.S. Pat. No. 4,584,603, each signal supplied to the video displays is transmitted through respective independent transmitting lines (one for each video display) to the respective video displays. In order to transmit many signals to each display, many transmission lines are required for each display. As a result, the system wiring is very complicated, and the arrangement of the overall system is also very complicated. If the U.S. Pat. No. 4,584,603 system would be modified to be capable of two way communication, so that each of the video displays could transmit information (such as information regarding the condition of the associated seat) to the control apparatus, even more transmission lines would be required, so that the system would become even more complicated. It would be almost impossible to wire these transmission lines in a large aircraft such as one having more than 500 seats. It would be desireable to eliminate this problem, by providing a two way communication system capable of transmitting many information signals in two directions and without complicated wiring in a passenger vehicle such as an aircraft.

SUMMARY OF THE INVENTION

The present invention includes:

(a) a head end apparatus comprising means for generating a polling command signal, and means for receiving a polling answer signal;

(b) a plurality of terminal apparatus units, each comprising means for decoding the polling command signal, means for generating the polling answer signal in response to the polling command signal, and means for generating a random access signal;

(c) means for sending the polling answer signal to the head end apparatus in a first channel and for sending the random access signal to the head end apparatus in a second channel; and (d) means for controlling the head end apparatus, the plurality of terminal apparatus units, and the sending means.

These and other features and advantages of the present invention will become apparent from the following detailed description of the preferred embodiments in conjunction with the accompanying drawings, throughout which like reference numerals designate like elements and parts.

DESCRIPTION OF THE PREFERRED EMBODIMENTS

Several embodiments of a two way communication system according to the present invention will hereinafter be described with reference to the drawings In a preferred embodiment, the system is capable of transmitting video signals, audio signals, and other signals.

The "transmitting side" (also referred to as the "central control portion" or "central control unit") of invention will first be described with reference to FIG. 1.

Figure 1:
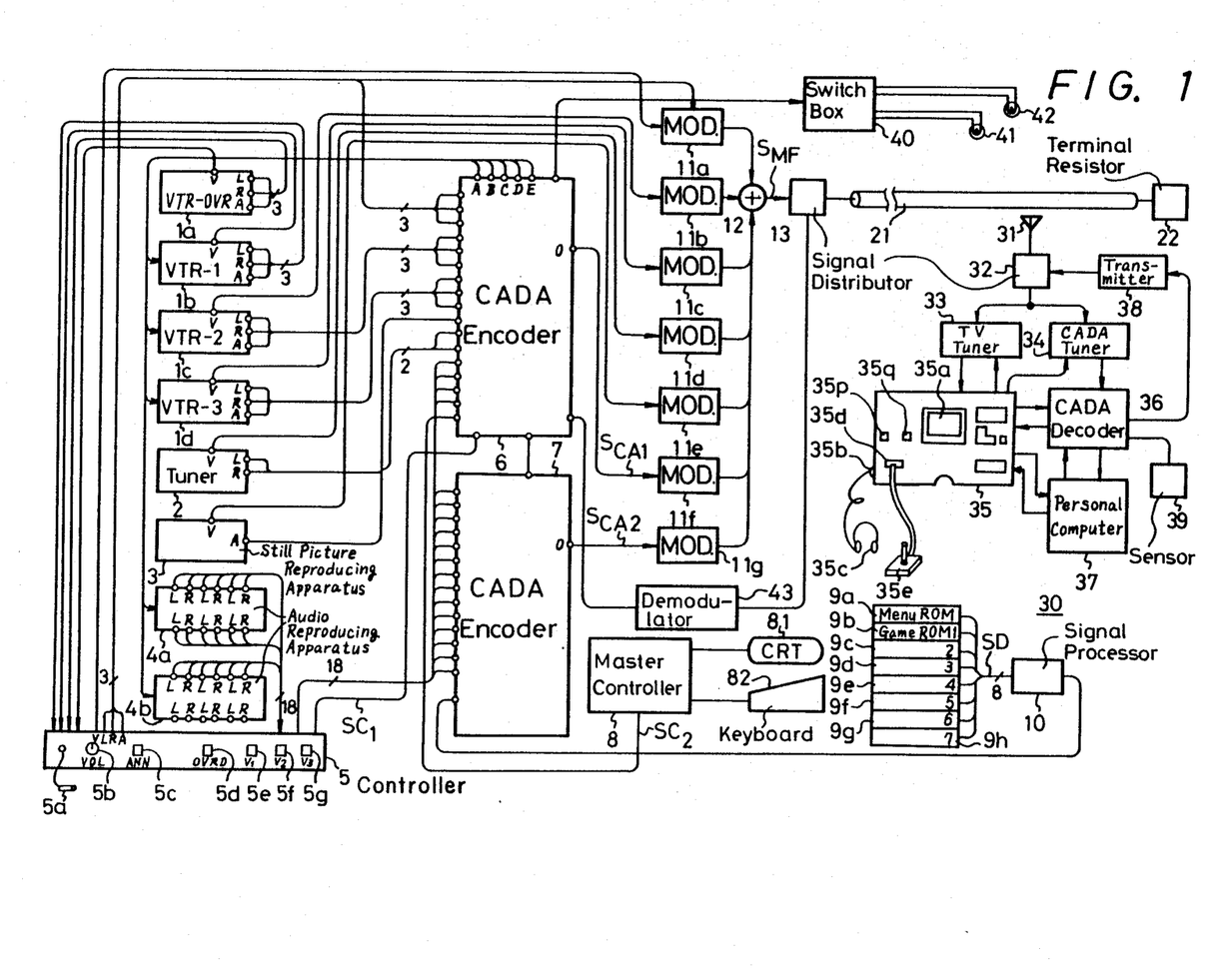
FIG. 1 is a circuit block diagram showing the whole arrangement of an embodiment of a two way communication system according to the present invention.

In FIG. 1, reference numerals $1a$ to $1d$ designate video tape recorders provided in the transmitting side such as in an aircraft crew's room. Video tape recorder $1a$ is used for an override operation and may be loaded with a cassette tape explaining how to put on a life-jacket or the like. Each of video tape recorders $1b$ to $1d$ is loaded with a cassette tape of a video program such as a movie. Each of video tape recorders $1a$ to $1d$ is respectively provided with a terminal V for outputting a reproduced video signal and with terminals L, R and A for outputting reproduced audio signals. In an embodiment in which video tape recorders $1a$ to $1d$ store bi-lingual programs, terminals L and R are used for outputting left-channel and right-channel audio signals in a first language, respectively, and terminal A is used for outputting a monaural audio signal in a second language.

Television tuner 2 is provided with a terminal V for outputting a video signal and terminals L and R for outputting the left and right channels of an audio signal, respectively.

Still picture reproducing apparatus 3 is capable of reproducing still picture information recorded in a compact disk (CD) ROM, such as maps, an airport guiding drawing, or the like. The still picture reproducing apparatus 3 is provided with a terminal V for outputting a video signal representative of a still picture and a terminal A for outputting an audio signal associated with the still picture.

Audio reproducing apparatus 4a and audio reproducing apparatus 4b each include three sets of compact disk players (CD players) and tape recorders. The audio reproducing apparatus 4a, 4b are respectively provided with six pairs of terminals L and R for outputting left channel and right channel audio signals.

Controller 5 comprises a microphone 5a, a volume control 5b for adjusting the level of an audio signal received at the microphone 5a, an announce key 5c, an override key 5d and pause keys 5e to 5g for setting the video tape recorders 1b to 1d into pause mode. Video signals from the respective terminals V of the video tape recorders 1a, 1b and audio signals from the respective terminals L, R and A of these recorders are supplied to controller 5. Controller 5 is provided with a terminal V for outputting a video signal and terminals L, R and A for outputting audio signals. Usually, the terminals V, L, R and A of the controller 5 output the video signal supplied from terminal V of the video tape recorder 1b and the audio signals supplied from terminals L, R and A of video tape recorder 1b. However, when the override key 5d is pressed to trigger the override operation, the terminals V, L, R and A of the controller 5 output the video signal supplied from terminal V of video tape recorder 1a and audio signals supplied from terminals L, R and A of video tape recorder 1a. When the announce key 5c is pressed to initiate the announce operation, an audio signal from microphone 5a is delivered to the output terminal A of controller 5.

CADA encoders 6 and 7 are of the type used in the conventional cable digital audio/data transmission system (CADA system) disclosed in U.S. Pat. No. 4,684,981 issued Aug. 4, 1987. The CADA encoders are capable of time-division-multiplexing a plurality of digital audio and data signals and transmitting the multiplexed signals over a vacant one channel band width (6 MHz) of a CATV, thus transmitting signals (e.g., music) with high efficiency without damaging their quality. Each of CADA encoders 6 and 7 is provided with an A/D (analog-to-digital) converter and a shift register. The time-division-multiplexing operation is carried out by converting a plurality of audio signals into digital signals in the A/D converter, inputting the digital signals in parallel to the shift register at predetermined locations, and then outputting the digital signals from the shift register in series at a high speed. Not only digital audio signals but also control data and data comprising computer software can be multiplexed by the CADA encoders in this manner.

The audio signals delivered to the output terminals L, R and A of controller 5 are supplied to encoder 6. The audio signals delivered to the output terminals L, R and A of the video tape recorders 1c and 1d are also supplied to encoder 6. The audio signals delivered to the output terminals L and R of the tuner 2 and the output terminal A of the still picture reproducing apparatus 3 are also supplied to encoder 6. The audio signals delivered to the six pairs of output terminals L and R of audio reproducing apparatus 4a and the six pairs of output terminals L and R of audio reproducing apparatus 4b are supplied to encoders 6 and 7 through controller 5.

When one of the override key 5d, the announce key 5c, and the pause keys 5e to 5g of the controller 5 is pressed, the controller 5 generates control data $SC_1$ having contents corresponding to the pressed key. The control data $SC_1$ is supplied to the encoder 6.

Encoder 6 has output terminals A to E from each of which a pause control signal is outputted in response to the control data $SC_1$. The video tape recorders 1b to 1d and the audio reproducing apparatus 4a and 4b are respectively controlled by the pause signals delivered from the terminals A to E of the encoder 6. More specifically, when the override key 5d and the announce key 5c are pressed, the pause control signal is outputted from all of the terminals A to E, so that the video tape recorders 1b to 1d and the audio reproducing apparatus 4a and 4b all enter a pause mode. When the pause keys 5e to 5g are pressed, pause control signals are outputted from output terminals A to C, placing the video tape recorders 1b to 1d into a pause mode, respectively.

A master controller 8 is provided. Master controller 8 comprises a computer which controls the overall system, and is preferably located in the cabin of the aircraft. Master controller 8 is connected with a display 81 and a keyboard 82. Master controller 8 generates control data $SC_2$ (for controlling one or more terminal apparatus units located in the receiving side of the system) in response to a command from keyboard 82 and supplies control data $SC_2$ to encoder 6. The control data $SC_2$ may be, for example, data for controlling the luminance of a display in the terminal apparatus, data for polling the conditions of each passenger seat at which a terminal apparatus is located, or other data. The data can be monitored by the display 81 connected to the master controller 8.

Menu data is written in ROM 9a, and a different set of game data is written in each of ROMs 9b to 9h. Each data signal SD read out from the ROMs 9a to 9h (for example, for use with computer software) is supplied to a signal processing circuit 10 in which, for example, an error correcting code may be added thereto, and is supplied to encoder 7 thereafter.

Control data signals $SC_1$ and $SC_2$ are supplied also to the encoder 7 from the encoder 6.

A time-division-multiplexed signal $S_{CA1}$ emerges from output terminal 0 of encoder 6. Signal $S_{CA1}$ includes the plurality of digitally converted audio signals generated in encoder 6, and the control data $SC_1$ and $SC_2$ supplied to encoder 6. The signal $S_{CA1}$ is supplied to a modulator 11f to be amplitude-modulated, preferably by a VSB (vestigial sideband) system.

A time-division-multiplexed signal $S_{CA2}$ emerges from an output terminal 0 of the encoder 7. Signal $S_{CA2}$ includes the plurality of digitally converted audio signals generated in encoder 7, and the control data ($SC_1$ and $SC_2$) and the signal SD supplied to encoder 7. The signal $S_{CA2}$ is supplied to modulator 11g to be amplitude-modulated, preferably by a VSB system.

The video signal delivered to the output terminal V of controller 5 is supplied to modulator 11a. The audio signal delivered to the terminal A of controller 5 is supplied both to modulator 11a and to encoder 6. In modulator 11a, an ordinary television signal is generated by frequency modulating the audio signal and frequency-multiplexing the frequency modulated audio signal with the video signal. This television signal is thereafter amplitude-modulated, preferably by a VSB system.

The video signals delivered to the respective output terminals V of the video tape recorders 1c, 1d, the tuner 2, and the still picture reproducing apparatus 3 are respectively supplied to modulators 11b to 11e to be amplitude-modulated, preferably by a VSB system.

The modulators 11a to 11g modulate the signals supplied thereto in frequency bands chosen so as to prevent cross modulation, such as in every other channel above the 60 channels of the television broadcasting band.

Output signals from the modulators 11a to 11g are supplied to an adder 12 in which they are frequency-multiplexed. The frequency-multiplexed signal $S_{MF}$ from the adder 12 is supplied through a signal distributor 13 to one end of a leaky cable 21. Cable 21 serves as a bi-directional signal transmission means. The other end of leaky cable 21 terminates at terminal resistor 22. A coaxial cable whose periphery is spirally indented so as to leak a large amount of signals is suitable for use as cable 21.

The receiving side of the system of the invention will next be described.

FIG. 1 shows terminal apparatus unit 30, of the type that preferably will be mounted on the back of a plurality of passenger seats in an aircraft. Although only one terminal apparatus unit 30 is illustrated in FIG. 1, preferably there will be the same number of units of apparatus 30 as there are passenger seats in the aircraft. The terminal apparatus 30 is provided
with an antenna 31 which receives the frequency multiplexed signal $S_{MF}$ leaking from the leaky cable 21. The frequency-multiplexed signal $S_{MF}$ received at the antenna 31 is supplied through a signal distributor 32 to a television tuner 33 and a CADA tuner 34. Tuner 33 is capable of selectively receiving channels in the output frequency bands of the modulators 11a to 11e, while the tuner 34 is capable of selectively receiving channels in the output frequency bands of the modulators 11f and 11g. Tuners 33 and 34 are controlled in their channel selections by a selection and display apparatus 35.

Video and audio signals emerging from tuner 33 are supplied to the selection and display apparatus 35, and the time-division-multiplexed signal $S_{CA1}$ or $S_{CA2}$ emerging from tuner 34 is supplied to a CADA decoder 36. The CADA decoder 36 is constructed so as to effect substantially the inverse operations to those performed in CADA encoders 6 and 7. More specifically, CADA decoder 36 decodes the time-division-multiplexed signal $S_{CA1}$ or $S_{CA2}$ or CADA data, produces a desired demultiplexed signal, and supplies the same to selection and display apparatus 35 or personal computer 37. An embodiment of decoder 36 is described in above-referenced U.S. Pat. No. 4,684,981, and a preferred embodiment will be described below with reference to FIG. 4.

Figure 2:
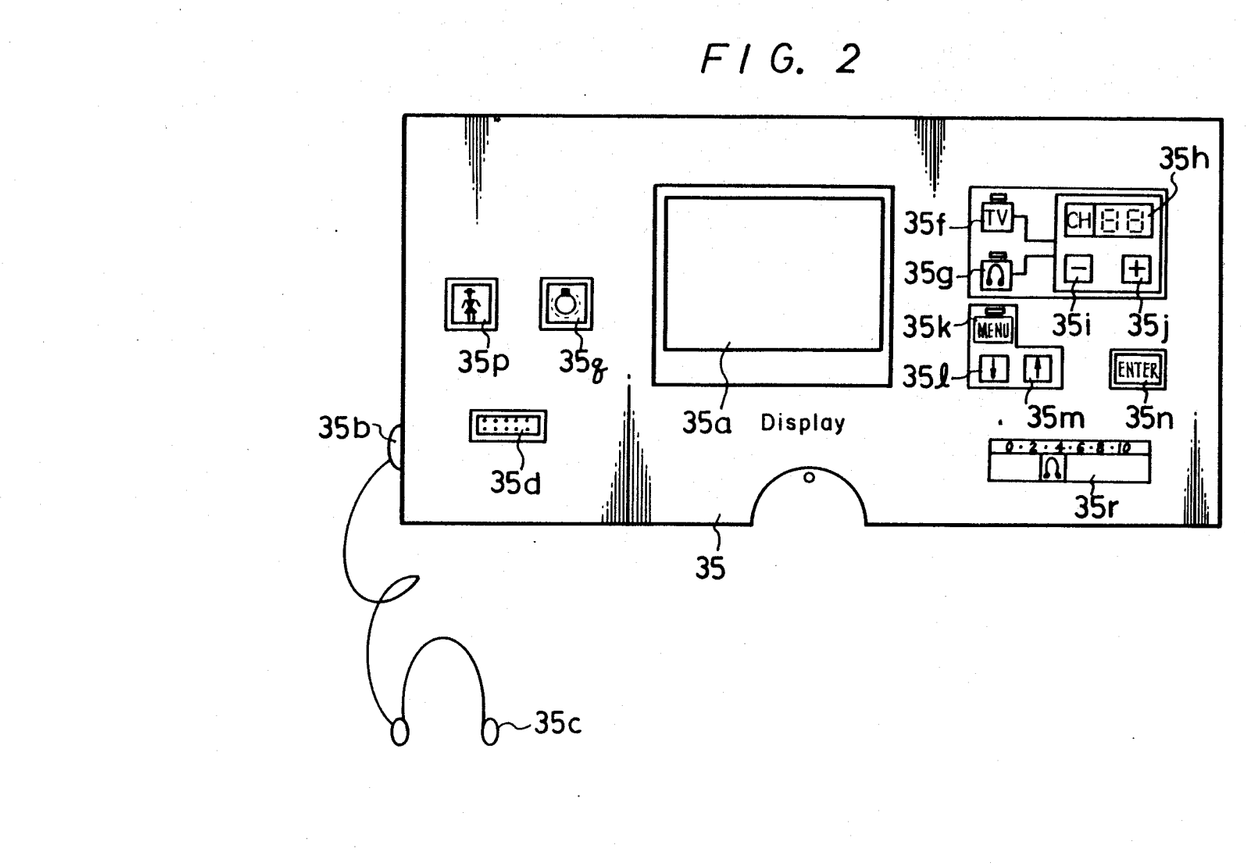
FIG. 2 is a plan view showing a panel of a selection and display apparatus appearing in FIG. 1.
Figure 3:
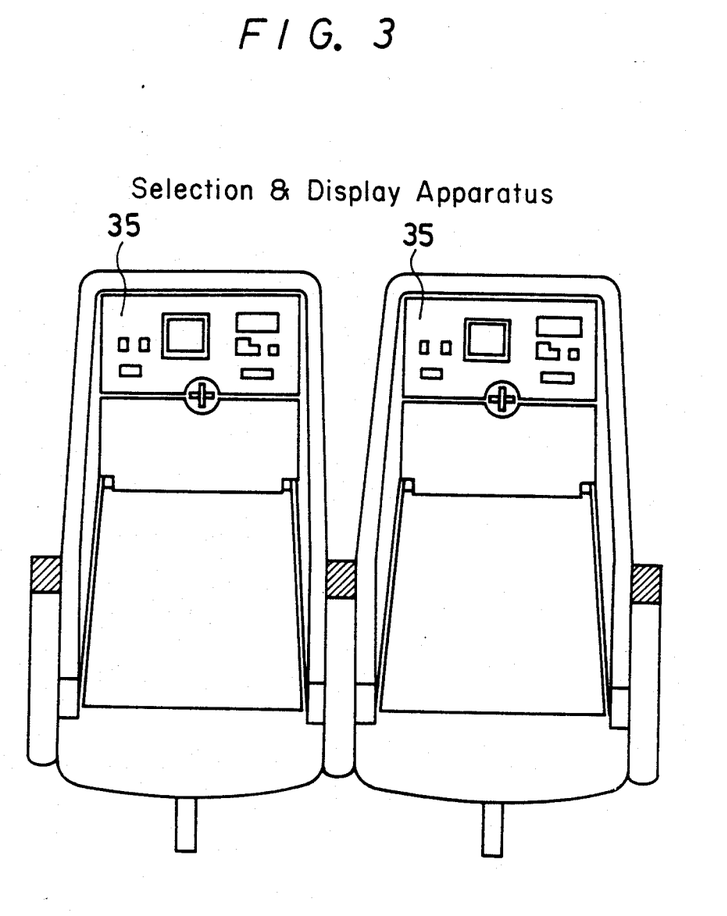
FIG. 3 is a view of two units of the selection and display apparatus of the invention, each mounted on a passenger seat.

FIG. 2 is an example of a preferred arrangement of the panel of selection and display apparatus 35. The panel of selection and display apparatus 35 may be mounted on the back of a passenger seat, as shown in FIG. 3.

FIG. 2 shows a display 35a, which may comprise a flat cathode ray tube or an LCD (liquid crystal display) or the like, an audio output terminal 35b for connecting a pair of head phones 35c thereto, and a game terminal 35d for connecting a joy stick 35e (shown in FIG. 1), or a keyboard (indicated by dotted lines in FIG. 1), or the like for playing games.

Further, the selection and display apparatus 35 is provided with a television selecting key 35f, *a music selecting key 35g* a channel display 35h, a channel-down key 35i and a channel-up key 35j.

The television channel can be sequentially changed by first pressing the television selecting key 35f and then pressing the channel-down key 35i or the channel-up key 35j. Thus, when the channel received by the television tuner 33 is changed sequentially, the display 35a sequentially displays images reproduced from the video signals derived from the video tape recorders 1b to 1d, the tuner 2 and the still picture reproducing apparatus 3, and corresponding audio signals from CADA decoder 36 are outputted to the audio output terminal 35b. When the audio signal is bi-lingual, two audio channels are assigned for one video display. A first language is outputted from the first channel; and a second language from the second channel.

The music channel can be sequentially changed by first pressing the music selecting key 35g and then pressing the channel-down key 35i or the channel-up key 35j. In this manner, the audio signal outputted from the CADA decoder 36 is changed, and the audio signals outputted from the audio reproducing apparatus 4a and 4b are sequentially outputted to the audio signal output terminal 35b.

The selection and display apparatus 35 is also provided with a menu display key 35k, a cursor-down key 35l, a cursor-up key 35m and an enter key 35n. By pressing the menu key 35k, a video signal based on data from the menu ROM 9a is supplied to the selection and display apparatus 35 from the personal computer 37 and a menu is displayed on the display 35a.

By pressing the enter key 35n after selecting a game by moving the cursor on the display with the cursor-down key 35l and the cursor-up key 35m, a video signal and an audio signal based on data of the selected game from the game ROMs 9b to 9h are supplied from the personal computer 37 to the selection and display apparatus 35. Then, the game is displayed on the display 35a and the game sound signal is outputted to the audio output terminal 35b.

Selection and display apparatus 35 also includes an attendant call key 35p, a reading light key 35q and a volume control 35r.

A frequency-multiplexed signal $S_{MF}$ including the control data $SC_2$ delivered from the master controller 8 through the CADA encoder 6 to the leaky cable 21 is received by the antenna 31 of each terminal apparatus unit 30 and supplied to the CADA tuner 34 of the unit 30 when CADA tuner 34 receives the aforementioned signal $S_{CA1}$ (which is the CADA data from the frequency-multiplexed signal $S_{MF}$) CADA tuner 34 supplies the same to the CADA decoder 36.

Figure 4:
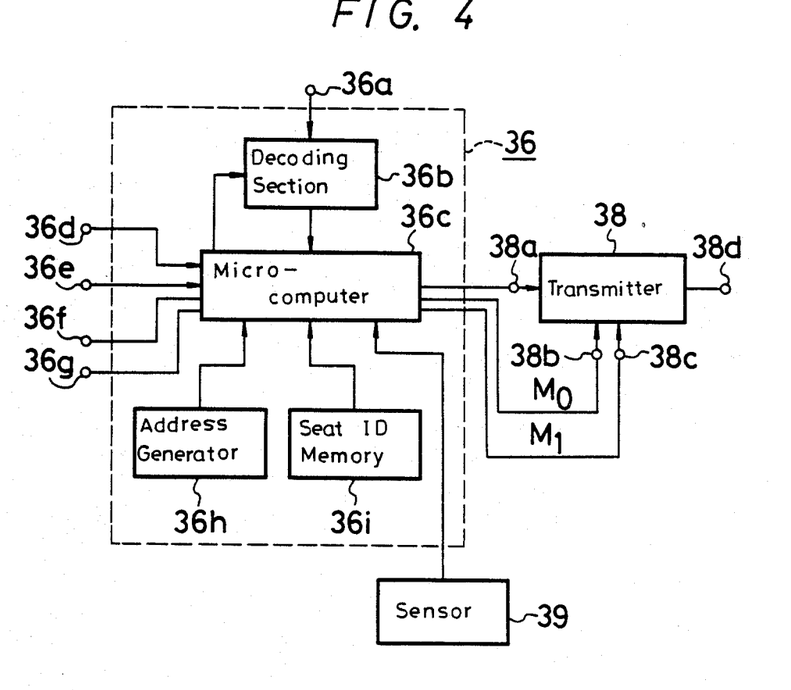
FIG. 4 is a circuit block diagram showing a main portion of the terminal apparatus of FIG. 1.

The CADA decoder 36 is preferably constructed as shown in FIG. 4. When the CADA decoder 36 is supplied with the signal $S_{CA1}$ from the CADA tuner 34, the signal $S_{CA1}$ is supplied through a CADA data input terminal 36a to a decoding section 36b. The decoding section 36b decodes predetermined necessary data from the CADA data in accordance with a command from a microcomputer 36c provided in the decoder 36 (or a command included in the CADA data) and supplies the same to the microcomputer 36c.

Microcomputer 36c is also supplied with a selection signal indicative of an operation of one of the keys of selection and display apparatus 35 through a selection signal input terminal 36d and a game data selection signal included in CADA data from the personal computer 37 through a game selection signal input terminal 36e.

Microcomputer 36c supplies various decoded data signals (such as audio signals) through an output terminal 36f to the selection and display apparatus 35 and decoded game data signals through an output terminal 36g to the personal computer 37.

CADA decoder 36 contains an address generator 36h and a seat ID memory section 36i. The address generator 36h supplies the microcomputer 36c with information indicative of the location of a seat at which the terminal apparatus 30 is installed (or a seat at which a passenger who uses the terminal apparatus 30 sits). Seat ID memory section 36i supplies microcomputer 36c with information relative to the seat at which the terminal apparatus 30 is installed (or seat at which a passenger who uses the terminal apparatus 30 sits), such as the manufacture date and the model number thereof and so on.

The microcomputer 36c is connected with a sensor 39 which detects conditions of the seat, such as whether the seat belt is fastened and at which position the seat is reclined, and supplies the detected data to the microcomputer 36c.

The CADA decoder 36 can transmit predetermined signals through a transmitter 38 to the master controller 8 of the central control apparatus. The transmitter 38 is provided with a transmitted signal input terminal 38a for receiving signals from CADA decoder 36, and first and second change-over signal input terminals 38b, 38c which receive change-over signals from CADA decoder 36. Transmitter 38 can be operated in two transmission modes, that is, a polling transmission mode and a random access transmission mode, to be discussed below. Transmitter 38 multiplexes signals fed to the input terminal 38a with a predetermined carrier in response to signals fed thereto through the change-over signal input terminals 38b and 38c, and outputs the multiplexed signal from an output terminal 38d.

Figure 5:
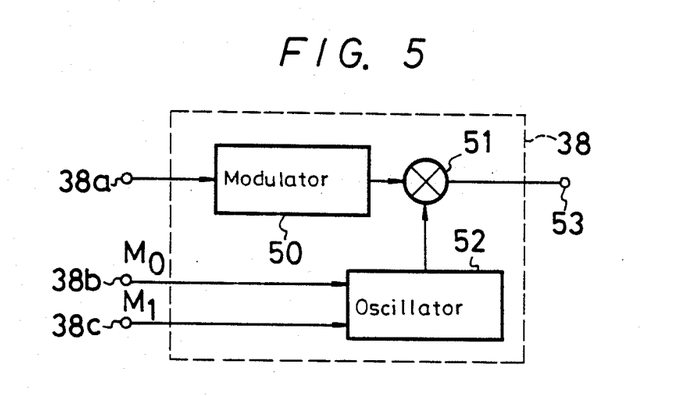
FIG. 5 is a circuit block diagram showing a construction of a transmitter of the terminal apparatus appearing in FIG. 1.

FIG. 5 is a preferred embodiment of transmitter 38. A transmitted signal supplied from CADA decoder 36 to transmitted signal input terminal 38a is supplied to modulator 50. Modulator 50, which modulates the signal received at input terminal 38a to an FSK signal for transmission, supplies its output signal to multiplexer 51. Multiplexer 51 multiplexes the transmitted signal emerging from modulator 50 with a carrier generated by an oscillator 52 and modulates the transmitted signal.

Figure 6:
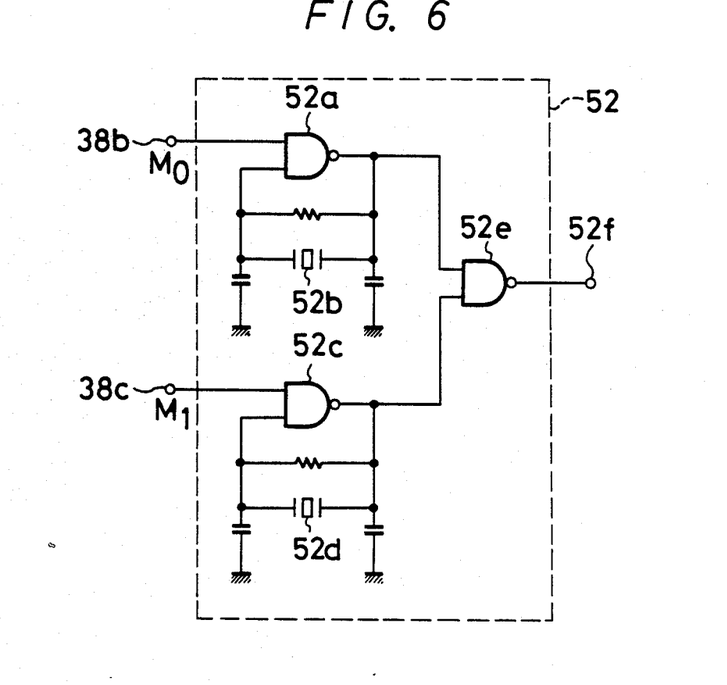
FIG. 6 is a circuit block diagram showing a construction of an oscillator shown in FIG. 5.

Oscillator 52, which is preferably constructed as shown in FIG. 6, is supplied with a first signal (determined in accordance with Table 1) from CADA decoder 36 through terminal 38b in the random access transmission mode, and with a low level signal "0" from CADA decoder 36 through terminal 38c during the polling transmission mode. Terminal 38b is connected to one of input terminals of a first NAND gate circuit 52a. The other input terminal of circuit 52a and an output terminal of circuit 52a are connected with each other through a first quartz oscillator 52b. Quartz oscillator 52b generates a 779.0 MHz carrier for the terminal 38c is connected to one of input terminals of a second NAND gate circuit 52c. The other input terminal of circuit 52c and an output terminal of circuit 52c are connected with each other through a second quartz oscillator 52d. The second quartz oscillator 52d generates a 779.2 MHz carrier for the above-mentioned polling transmission. The output terminals of the first and second NAND circuits 52a, 52c are respectively connected to a first and second input terminal of a third NAND circuit 52e. And an output terminal of the third NAND circuit 52e is connected to output terminal 52f of oscillator 52.

By thus constructing oscillator 52, an oscillating signal corresponding to a carrier for random access transmission (produced by first quartz oscillator 52b) is fed to the output terminal 52f when the terminal 38b is supplied with the high level signal, and an oscillating signal corresponding to a carrier for polling transmission (produced by second quartz oscillator 52d) is fed to the output terminal 52f when the terminal supplied with the high level signal. Therefore, the signal supplied to multiplexer 51 from oscillator 52 is automatically changed over to the carrier signal for random access transmission or that for polling transmission in response to signals supplied from CADA decoder 36 to terminals 38b and 38c to cause multiplexer 51 to effect modulations appropriate to the selected transmission mode.

Referring back to FIG. 4, the change-over signals supplied from CADA decoder 36 to the first and second change-over signal input terminals 38b, 38c are generated by microcomputer 36c on the basis of a polling flag included in the CADA data which polling flag is transmitted from the central control unit and decoded by decoding section 36b of CADA decoder 36. The polling flag included in the CADA data, which indicates whether or not polling transmission is to be carried out, is set to the high level "1" when the polling transmission is to be effected, and to the low level "0" when the polling transmission is not to be effected. Microcomputer 36c detects or judges the value of the polling flag and outputs the change-over signal corresponding to the detected value. The change-over signals emerging from microcomputer 36c depend upon the seat position information supplied to microcomputer 36c from address generator 36h. In the FIG. 4 embodiment, one address is assigned for each terminal apparatus 30 serving an even numbered seat, and another for each terminal apparatus 30 serving an odd numbered seat. Microcomputer 36c outputs the change-over signals as shown in the following Table 1. In Table 1, $M_0$ designates the change-over signal fed to the first change-over signal input terminal 38b, and $M_1$ the input terminal 38c.

TABLE 1

| Polling Flag | $M_0$ | $M_1$ | Transmission From Terminal Apparatus |
|---|---|---|---|
| "0" | "0" | "0" | No Transmission |
|  | "1" | "0" | Random Access Transmission (Odd No. Seats) |
|  | "0" | "1" | Random Access Transmission (Even No. Seats) |
| "1" | "0" | "0" | No Transmission |
|  | "1" | "0" | Random Access Transmission (All Seats) |
|  | "0" | "1" | Polling Transmission (All Seat) |

Figure 7:
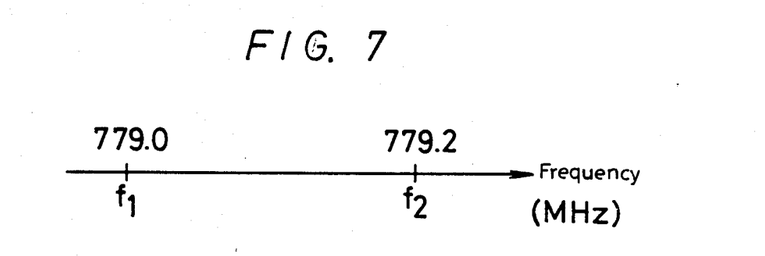
FIG. 7 is a diagram showing frequencies of carriers.

The change-over signals are transmitted from microcomputer 36c of CADA decoder 36 to transmitter 38 as described above. In the embodiment of FIGS. 4–6, when only the change-over signal $M_0$ delivered to the first input terminal 38b shows the high level "1", a frequency $f_1$ (779.0 MHz), as shown in FIG. 7, is selected for the carrier. However, when only the signal $M_1$ delivered to the second input terminal 38c shows the high level "1", a frequency $f_2$ (779.2 MHz) is selected for the carrier. The signal to be transmitted is multiplexed with the carrier in transmitter 38 and is supplied from the output terminal 38d of the transmitter through the signal distributor 32 to the antenna 31. Further, the signal is transmitted from the antenna 31 through the leaky cable 21 to the central control unit.

The signal supplied from the terminal apparatus 30 to the central control unit is separated by the signal distributor 13 from the other signals received from cable 21, and is supplied to demodulator 43 which demodulates the transmitted signal and supplies the same to CADA encoder 6. CADA encoder 6 then supplies master controller 8 with data on the basis of the transmitted signal from the terminal apparatus 30.

Reference is next made to the polling transmission mode, in which signals from the respective terminal apparatus units 30 are supplied to the central control unit under the control of the central control unit.

In a preferred embodiment, polling transmission is effected when the operator of master controller 8 in the central control unit enters appropriate commands for monitoring the condition of one or more units of terminal apparatus 30 or one or more seats. Let it now be assumed that the master controller 8 wants, for example, to monitor whether passengers in respective seats have fastened their seat belts or not. In this case, master controller 8 supplies CADA encoder 6 with the control data $SC_2$ for requiring each terminal apparatus 30 to transmit seat belt status information, in response to the corresponding command entered from the keyboard 82. Since the master controller 8 cannot simultaneously accept the responses from all the terminal apparatus units, the master controller 8 outputs the control data $SC_2$ sequentially in the order of the addresses assigned to each terminal apparatus unit 30 to be polled. If there are e.g., 150 passengers in the aircraft, the master controller 8 outputs the control data $SC_2$ 150 times, addressing all of the 150 seats sequentially in the order of the addresses. The control data $SC_2$ includes the aforementioned polling flag.

The control data $SC_2$ is supplied to CADA encoder 6 to be time-division-multiplexed with other signals (such as audio signals) as mentioned above for transmission as the signal $S_{CA1}$. The signal $S_{CA1}$ as CADA data is supplied through the leaky cable 21 to the respective terminal apparatus units 30. When the signal $S_{CA1}$ is supplied to a terminal apparatus unit 30, it is decoded by the decoding section 36b of the CADA decoder 36 in the terminal apparatus unit 30, and the microcomputer 36c evaluates the control data $SC_2$ in the decoded CADA data. When the address specified by the control data $SC_2$ coincides with the address of the terminal apparatus unit 30 supplied from address generator 36h, the microcomputer 36c of the term apparatus unit 30 supplies the transmitted signal input terminal 38a of the transmitter 38 with an information signal indicating whether the seat belt is fastened, as instructed by the control data $SC_2$. This information signal is supplied from sensor 39 to the microcomputer 36c. In the polling transmission mode, the first and second change-over signal input terminals 38b, 38c of the transmitter 38 are supplied with the low level signal "0" and the high level signal "1", respectively. By thus supplying the change-over signals, the information signal to be transmitted (indicating whether the seat belt is fastened), is multiplexed with the carrier $f_2$ (779. 2 MHz) and supplied to the output terminal 38d of the transmitter 38. Then the information signal is supplied from the output terminal 38d through the signal distributor 32 and the antenna 31 to the leaky cable 21. The information signal is then supplied from the leaky cable 21 through the signal distributor 13, the demodulator 43 and the CADA encoder 6 to the master controller 8. When the seat belt information signal is supplied to the master controller 8, the master controller 8 outputs the control data $SC_2$ for requiring a similar information signal on another seat belt, specifying another seat address. Thus, the master controller 8 sequentially outputs control data signals $SC_2$ requiring seat belt information to all terminal apparatus units 30 of interest.

As described above, all terminal apparatus units 30 (each corresponding to a different seat) are instructed to transmit seat belt status information to the master controller 8. It is therefore possible to monitor in the master controller 8 passengers who have their seat belts fastened and those have not fastened their seat belts by displaying the seat belt status information received from units 30 on the CRT 81. The time period necessary for this operation (that is, the period from the time the master controller 8 outputs the first signal to the time the master controller 8 receives all the answers) is very short so that the polling transmission can be carried out quickly for as many as 150 terminal apparatus units 30. The above-described example is for the case where the information monitored by the master controller 8 indicates whether or not each seat belt is fastened. In addition to this information, master controller 8 is capable of collecting and monitoring a variety of information signals which can be detected by the microcomputer 36c, for example, regarding the reclining conditions of the respective seats detected by the sensor 39, channels selected for display on display 35a of apparatus 35, food menus selected by the cursor keys, articles sold in the cabin also selected by the cursor keys, and so on.

Next, reference is made to the random access transmission mode in which the central control unit is supplied with such signals as may be generated at any of the respective terminal apparatus units 30.

Figure 8:
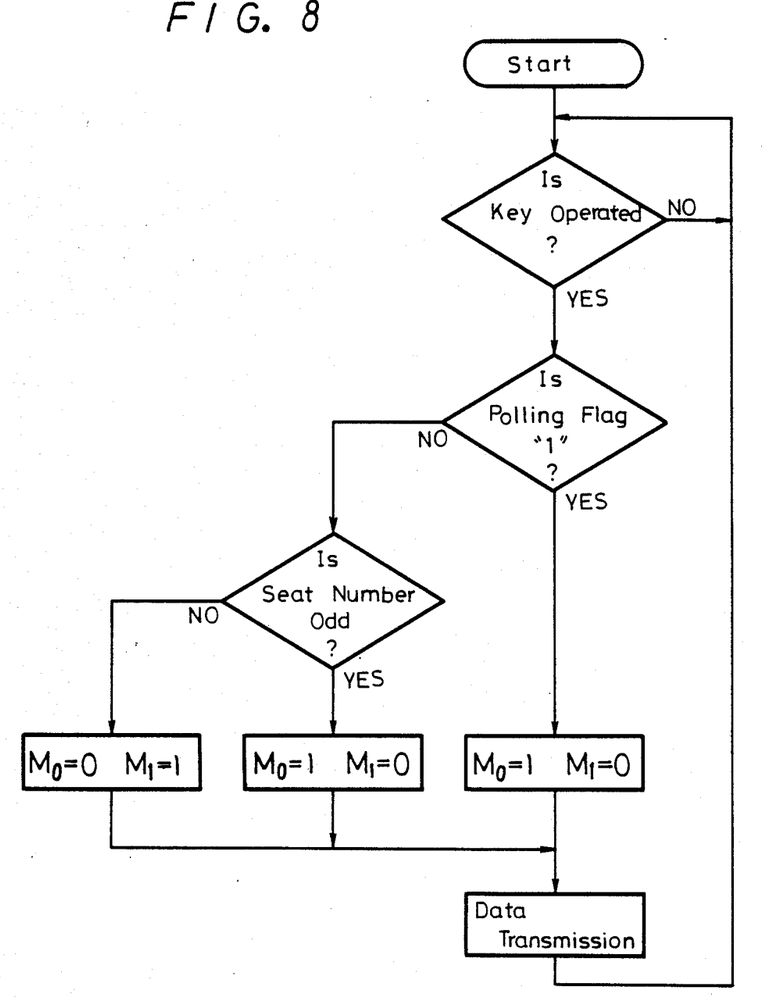
FIG. 8 is a flowchart showing operation of the invention in, its random access transmission mode.

Random access transmission is effected when the attendant call key 35p or the reading light key 35q on the selection and display apparatus 35 is pressed. When the attendant call key 35p is pressed, an attendant call signal is supplied from the selection and display apparatus 35 through the input terminal 36d to the microcomputer 36c of the CAD decoder 36. When the attendant call signal is supplied to the microcomputer 36c, this attendant call signal and the address signal of the seat generated from the address signal generator 36h are supplied to the transmission signal input terminal 38a of the transmitter 38 as a signal to be transmitted. This signal is multiplexed with carrier $f_1$ or $f_2$ (corresponding to the signals delivered to the change-over signal input terminals 38b and 38c) to generate a transmitting signal and thereafter this transmitting signal is supplied to the output terminal 38d of the transmitter 38. The selection of the carrier $f_1$ or $f_2$ depends on the change-over signals $M_0$ and $M_1$ generated by the microcomputer 36c. The values of change-over signals $M_0$ and $M_1$ are determined by a flowchart as shown in FIG. 8 which will hereinafter be explained in detail. When the attendant call key 35p is pressed and the random access transmission is then carried out, the attendant call signal is detected whether the polling flag included in the CADA data is at the high level signal "1" (indicating that the polling transmission is effected) or not. If the answer is affirmative or yes (the polling flag is equal to "1"), the change-over signal $M_0$ is set to the high level signal "1" and the change-over signal $M_1$ to the low level signal "0". Then, these change-over signals $M_0$, $M_1$ are supplied to the transmitter 38. By supplying the transmitter 38 with the change-over signals $M_0$, $M_1$ thus set, the attendant call signal to be transmitted is multiplexed with the carrier $f_1$ and then delivered to the output terminal 38d. The random access transmission is effected in a different band (carrier $f_1$) from the band for the polling transmission (carrier $f_2$) by selecting the carrier $f_1$ as described above.

On the other hand, when the polling flag shows the low level signal "0" (the system is not in the polling transmission mode), microcomputer 36c evaluates the address signal from address generator 36h. If the seat number is odd, the change-over signals $M_O$, $M_1$ are set to the high level signal "1" and the low level signal "0", respectively, as shown in FIG. 8 and Table 1, and supplied to the transmitter 38. By thus supplying the change-over signals $M_0$, $M_1$, the signal to be transmitted is multiplexed with the carrier $f_1$ and delivered to the output terminal 38d, in the same manner as the case where the random access transmission is effected in the polling transmission mode.

When the polling flag shows the low level signal "0" and the seat number indicated by the address signal from the address generator 36h is even, the change-over signals $M_0$, $M_1$ are set to the low level signal "0" and the high level signal "1", respectively, as shown in FIG. 8 and Table 1 and supplied to the transmitter 38. By thus supplying the change-over signals $M_0$, $M_1$, the signal to be transmitted is multiplexed with the same carrier $f_2$ used for the polling transmission and delivered to the output terminal 38d.

The attendant call signal processed as described above is supplied from the output terminal 38d through the signal distributor 32 and the antenna 31 to the leaky cable 21. Then, from the leaky cable 21 the attendant call signal is delivered through the signal distributor 13 and demodulator 43 to the CADA encoder 6 of the central control unit. A switch box 40 is controlled by a CPU (not shown) in the CADA encoder 6 on the basis of this attendant call signal to light an attendant call lamp 41 corresponding to the seat indicated by the address signal.

When the reading light key 35q of a selection and display apparatus 35 is pressed, random access transmission is effected with one of the carriers $f_1$ and $f_2$ selected in the same manner as described above with reference to attendant call signal transmission. In response to receipt of the transmitted signal, switch box 40 is controlled by the CPU in CADA encoder 6 to light a reading lamp 42 corresponding to the seat indicated by the transmitted address signal.

As described above, each random access transmission request is delivered immediately from the terminal apparatus 30 to the central control unit, so that a response can be quickly made. Moreover, in a preferred embodiment, either of two transmission channels (i.e., one using carrier $f_1$ and the other using carrier $f_2$) is employed according to the seat number when the polling transmission is not effected. Accordingly, even if a random access transmission is effected simultaneously from an odd numbered seat and an even numbered seat, the instruction signals from the two seats are accurately delivered to the central control unit since these two signals are transmitted through different channels. The provision of two transmission channels increases the amount of data that may be transmitted in the random access transmission mode and facilitates quick turn-on of the attendant call lamp 41 and the reading lamp 42. However, if command signals are transmitted in the random access mode substantially simultaneously from two or more even numbered (or odd numbered) seats, the plurality of signals from the seats will likely collide in the same channel and hence be disturbed so that the commands cannot be transmitted to the central control unit. To avoid this problem, retransmission is carried out or these signals are repeatedly transmitted for a predetermined time period until they are respectively received by the central control unit. Either operation can be quickly performed. In the above-described preferred embodiment, half the seats are assigned to each channel so that the possibility of simultaneous transmissions in one channel is decreased fifty percent. Thus, the retransmission of data is also reduced by fifty percent, and the average transmission time is accordingly reduced.

In the above-described preferred embodiment, when polling transmission is not effected, the polling transmission channel is used as a second random access transmission channel. Thus, transmitter 38 need not be complicated. In practice, the system will likely be operated in the polling transmission mode for only a short time relative to the time in which it is operated in the random transmission mode, so that two channels can be used for random access transmission for most of the time.

Figure 9:
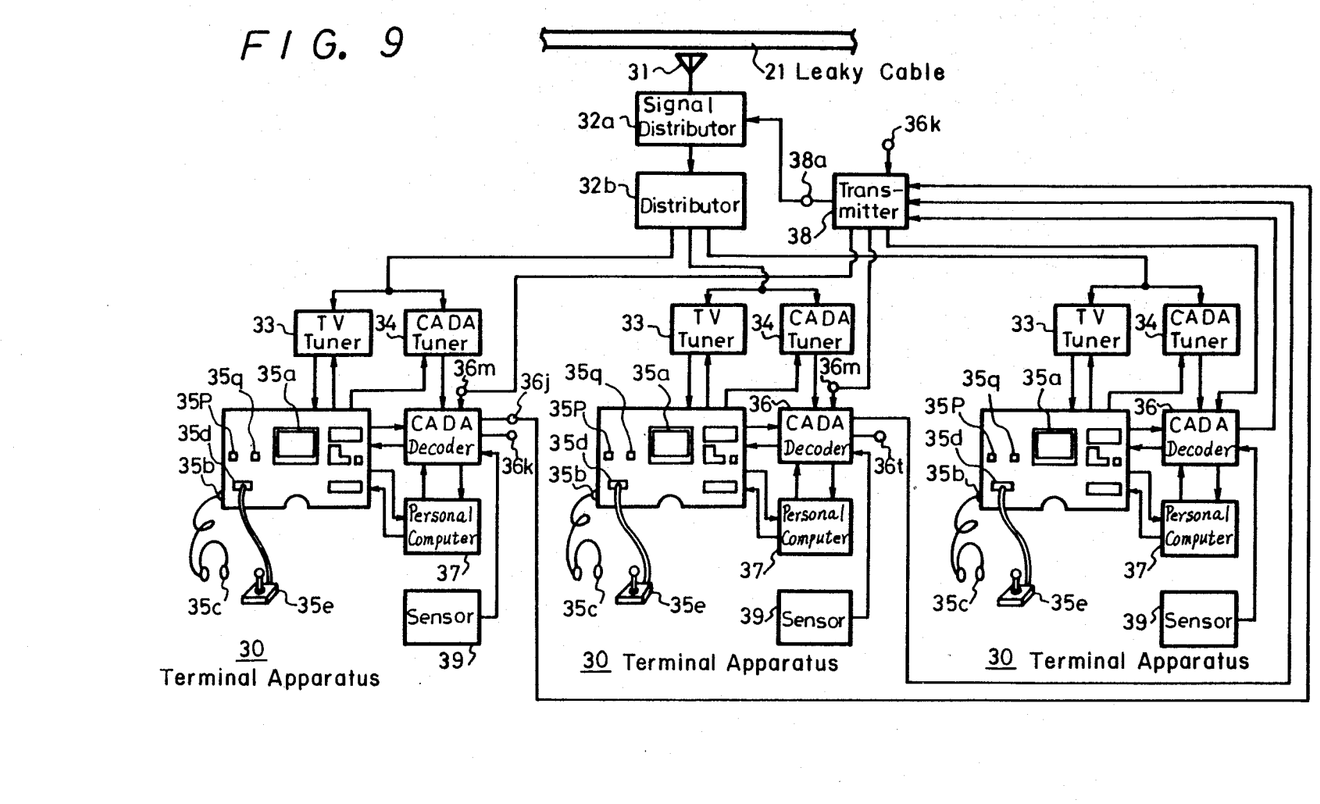
FIG. 9 is a circuit block diagram of a preferred embodiment of the terminal apparatus of the invention.

FIG. 9 is another preferred embodiment of the present invention in which each transmitter 38 and signal distributor 32 is shared by three units of terminal apparatus 30, and signal distributor 32 is comprises both signal distributor 32a and distributor 32b. The rest of the system components correspond to those in FIG. 1, and are designated by the same reference numerals. Explanation thereof will be omitted.

Figure 10:
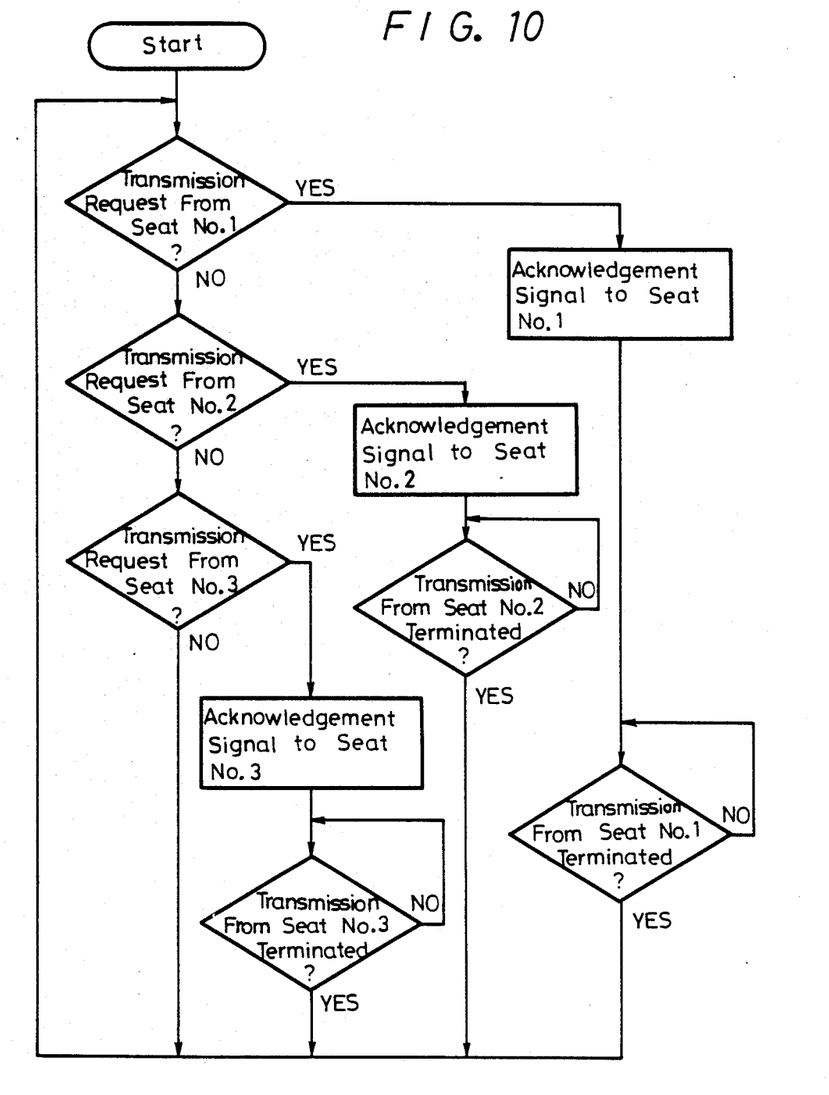
FIG. 10 is a flowchart showing operation of the FIG. 9 system in its random access transmission mode.

Operation of the FIG. 9 embodiment will next be described with reference to the flowchart of FIG. 10.

The three seats which share single transmitter 38 shall be designated as seats No. 1, No. 2 and No. 3, respectively. In the FIG. 9 embodiment, the microcomputer within transmitter 38 sequentially monitors transmission request signals supplied from the terminal apparatus 30 of each of the seats No. 1, No. 2 and No. 3. For example, if the microcomputer is supplied with a high level ("1") transmission request signal from first output terminal 38b of the terminal apparatus 30 for seat No. 1, the microcomputer returns an acknowledgement signal back to the CADA decoder 36 of the terminal apparatus 30 for seat No. 1 through the input terminal 36a. The CADA decoder 36, upon receiving the acknowledgement signal, supplies a signal to be transmitted through the output terminal 38a to the transmitter 38. Since the transmission request signal (the high level signal "1" from the terminal 36b) indicates random access transmission, the transmitter 38 multiplexes this transmission request signal with the aforementioned carrier $f_1$ and then transmits the multiplexed signal from the output terminal 38d through the leaky cable 21 to the central control unit. During the transmission, the CADA decoder 36 continues to supply the transmission request signal (the high level signal "1") to the transmitter 38. Even if the terminal apparatus 30 for seat No. 2 or 3 outputs a transmission request signal while the terminal apparatus 30 for seat No. 1 is transmitting the signal, the microcomputer in the transmitter 38 does not supply the terminal apparatus 30 for seat No. 2 or 3 with an acknowledgement signal until the terminal apparatus 30 for seat No. 1 terminates its transmission operation.

When the microcomputer transmitter 38 receives a low level ("0") transmission request signal (which indicates termination of a transmission), from the terminal apparatus for seat No. 1, the microcomputer in the transmitter 38 resumes sequentially monitoring the transmission request signals from the terminal apparatus 30 of all three of the seats Nos. 1, 2, and 3. If the microcomputer detects that the terminal apparatus 30 of the seat No. 2 or 3 outputs the high level signal "1", the microcomputer supplies the CADA decoder 36 for that apparatus with the acknowledgement signal in the same manner as described above and carries out the transmission.

It will be understood from the explanation given above that the signal transmission from a set of three seats No. 1, 2 and 3 is effected by a single transmitter 38 so that the required number of transmitters 38 and antennae 31 is one third the required number of terminal apparatus units 30 and accordingly the construction of the transmission apparatus can be simplified. In the embodiment described above, the microcomputer in transmitter 38 monitors the transmission request signals from the seats No. 1, 2 and 3 in sequence. However, in an alternative embodiment, the priority may be determined among the three seats.

In the embodiment described above with reference to FIGS. 9 and 10, since each transmitter 38 is used in common by three terminal apparatus units 30, it is not possible to effect transmissions simultaneously from the three seats. Even if keys are operated simultaneously in the terminal apparatus unit 30 of each of seats No. 1, 2 and 3, the transmissions are effected in sequence Thus, the probability that random access signals from a plurality of seats will collide in the leaky cable is reduced to approximately one third, and retransmission and the average time required for transmission are accordingly also reduced.

Although FIG. 9 shows one transmitter used in common by three seats, alternatively each transmitter may be used in common by two, four, or more than four seats.

Figure 11:
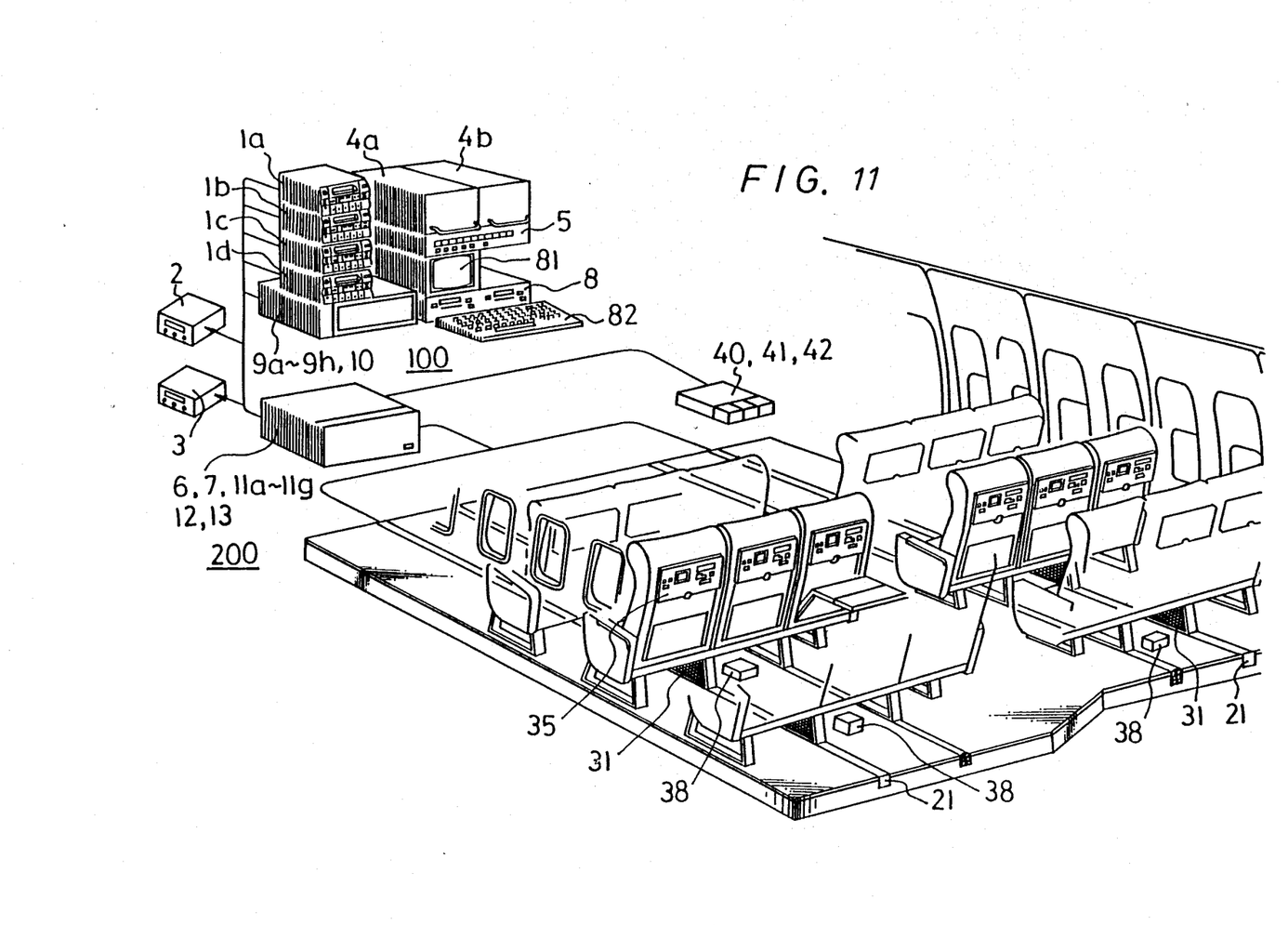
FIG. 11 is a perspective view of a preferred embodiment of the invention.

FIG. 11 shows the appearance of a preferred embodiment of an apparatus according to the present invention which is installed in a cabin of an aircraft. The parts in the FIG. 11 system corresponding to those in FIG. 1 are designated by the same reference numerals. In FIG. 11, ROMs 9a to 9h and the signal processing circuit 10 of FIG. 1 are accommodated in the same box 100, and the CADA encoders 6 and 7, modulators 11a to 11g, adder 12 and signal distributor 13 are disposed in box 200. Reference numerals 38 each designate a transmitter of the type shown in FIG. 9.

According to the two way communication system of the present invention, two channels, that is, the polling channel and the random access channel are provided between the central control unit and each terminal apparatus. When polling transmission is not effected, the polling channel is used for random access transmission, so that the number of random access channels is increased and accordingly more information can be transmitted in a shorter time.

The above embodiments have been described for the case where the present invention is embodied in an aircraft. The invention may also be implemented in a passenger vehicle such as train and bus, a theater, a stadium, or the like in the same manner as described above.

Although several preferred embodiments have been described, it will be apparent that many modifications and variations on the described embodiments could be effected without departing from the spirit or scope of the invention, as claimed below.

I claim as my invention:

1. A two way communication system, comprising:
   (a) a head end apparatus comprising means for generating a polling command signal, and means for receiving a polling answer signal;
   (b) a plurality of terminal units each comprising means for decoding said polling command signal, means for generating said polling answer signal in response to said polling command signal, and means for selectively generating a random access signal at each of the terminal units;
   (c) means for sending each said polling answer signal to the head end apparatus in a first channel and for sending at least one of said random access signals to the head end apparatus in a second channel; and
   (d) means for sending said polling command signal from the head apparatus to each of said terminal units;
   wherein said means (c) sends at least one of said random access signals in said second channel when said polling command signal is not supplied to the decoding means.

2. A two way communication system according to claim 1, also comprising an address generator means for supplying an address number for each terminal unit to the sending means, and wherein the channel in which said sending means sends each said random access signal depends on the address number obtained from said address generator means.

3. A two way communication system, comprising:
   (a) a head end apparatus comprising means for generating a polling command signal, and means for receiving a polling answer signal;
   (b) a plurality of terminal units each comprising means for decoding said polling command signal, means for generating said polling answer signal in response to said polling command signal, and means for selectively generating a random access signal at each of the terminal units;
   (c) means for sending each said polling answer signal to the head end apparatus in a first channel and for sending at least one of said random access signals to the head end apparatus in a second channel;
   (d) means for sending said polling command signal from the head apparatus to each of said terminal units; and
   (e) an address generator means for supplying an address number for each terminal unit to the sending means, wherein the channel in which said sending means sends each said random access signal depends on the address number obtained from said address generator means, wherein said sending means sends each said random access signal in one of said first and second channels when said address number is an odd number and in another of said first and second channels when said address number is an even number, and wherein said means (c) and (d) send at least one of said random access signals in said first channel and at least one of said random access signals in said second channel when said polling command signal is not supplied to the decoding means.

4. A two way communication system, comprising:
   (a) a head end apparatus comprising means for generating a polling command signal, and means for receiving a polling answer signal;

(b) a plurality of terminal units each comprising means for decoding said polling command signal, means for generating said polling answer signal in response to said polling command signal, and means for selectively generating a random access signal at each of the terminal units;

(c) means for sending each said polling answer signal to the head end apparatus in a first channel and for sending at least one of said random access signals to the head end apparatus in a second channel, wherein said sending means includes a transmitter; and (d) means for sending said polling command signal from the head apparatus to each of said terminal units; wherein said means (c) and (d) send at least one of said random access signals in said first channel and at least one of said random access signals in said second channel when said polling command signal is not supplied to the decoding means.

5. A two way communication system according to claim 4, in which said transmitter is shared by at least two of said terminal units.

6. A two way communication system, comprising:

(a) a head end apparatus comprising means for generating a polling command signal, and means for generating a polling answer signal;

(b) a plurality of terminal units each comprising means for decoding said polling command signal, means for generating said polling answer signal in response to said polling command signal, and means for selectively generating a random access signal at each of the terminal units;

(c) means for sending each said polling answer signal to the head end apparatus in a first channel and for sending at least one of said random access signals to the head end apparatus in a second channel;

(d) means for sending said polling command signal from the head apparatus to each of said terminal units; wherein said means (c) and (d) send at least one of said random access signals in said first channel and at least one of said random access signals in said second channel when said polling command signal is not supplied to the decoding means; and (e) a plurality of passenger seats, each passenger seat being provided with an attendant call light and a reading light, in which each of said terminal units is provided at a respective one of said passenger seats, and in which at least one of said terminal units further comprises means for sensing the status of a first passenger seat, said status sensing means being connected to said polling answer signal generating means, said polling answer signal being concerned with the status of said first passenger seat; and also comprising a key means for generating an attendant call signal and for generating a reading light signal, said key means being connected to said random access signal generating means and said random access signal being concerned with said attendant call signal and said reading light signal.

7. A two way communication system according to claim 6, in which said head end apparatus further comprises means for generating video programs, means for generating audio programs, and means for multiplexing said polling command signal, said video programs and said audio programs, and in which at least one of said terminal units further comprises:

means for receiving said video programs and audio programs, means for selecting desired ones of said video programs and audio programs, said selecting means being connected to said polling answer signal generating means, means for displaying said selected video programs, an audio output terminal for receiving said selected audio programs, and a volume control for controlling the volume of the selected audio programs received at the audio output terminal, said polling answer signal being concerned with selection of said video programs and audio programs.

8. A two way communication system according to claim 7, in which said head end apparatus further comprises a memory means for storing television game software signals and a means for multiplexing said television game software signals with said polling command signals, said video programs, and said audio programs, and wherein at least one of said terminal units further comprises a means for selecting desired ones of said television game software signals, and a means for processing said selected television game software signals, said processing means being connected to said polling answer signal generating means, and wherein said polling answer signal is concerned with selection of said television game software signals.

9. A two way communication system, comprising:

(a) a head end apparatus comprising means for generating a polling command signal and a polling answer signal, and display means connected to said polling command signal and polling answer signal generating means for monitoring said polling answer signal and said random access signal;

(b) a plurality of terminal units each comprising means for decoding said polling command signal, means for generating said polling answer signal in response to said polling command signal, and means for selectively generating a random access signal at each of the terminal units;

(c) means for sending each said polling answer signal to the head end apparatus in a first channel and for sending at least one of said random access signals to the head end apparatus in a second channel; and (d) means for sending said polling command signal from the head apparatus to each of said terminal units; wherein said means (c) and (d) send at least one of said random access signals in said first channel and at least one of said random access signals in said second channel when said polling command signal is not supplied to the decoding means.

10. A two way communication system according to claim 9, in which said head end apparatus further comprises keyboard means connected to said polling command generating means for generating said polling command signal.

* * * * *